Aug. 7, 1934.　　　　J. B. KNEIP　　　1,968,837
PROPELLER BLADE PITCH GAUGE
Filed Feb. 29, 1932　　2 Sheets-Sheet 1
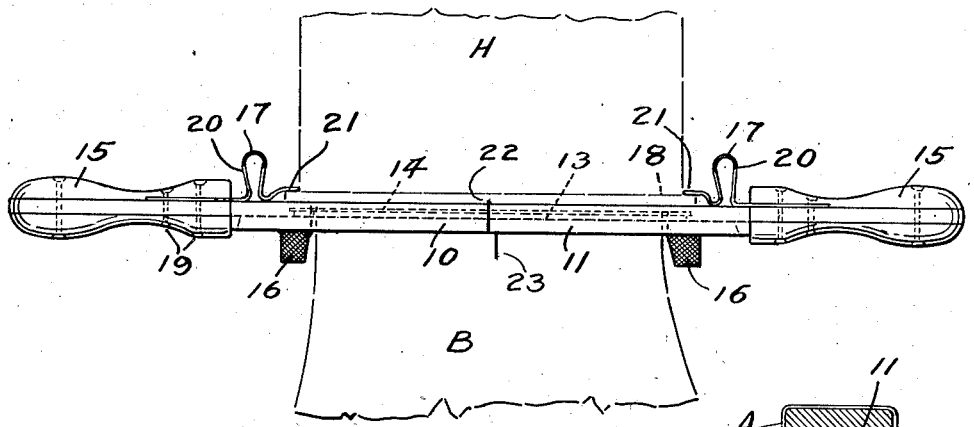
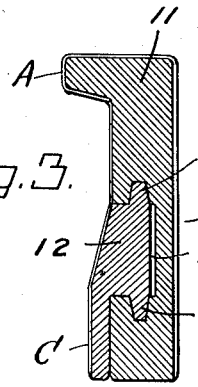
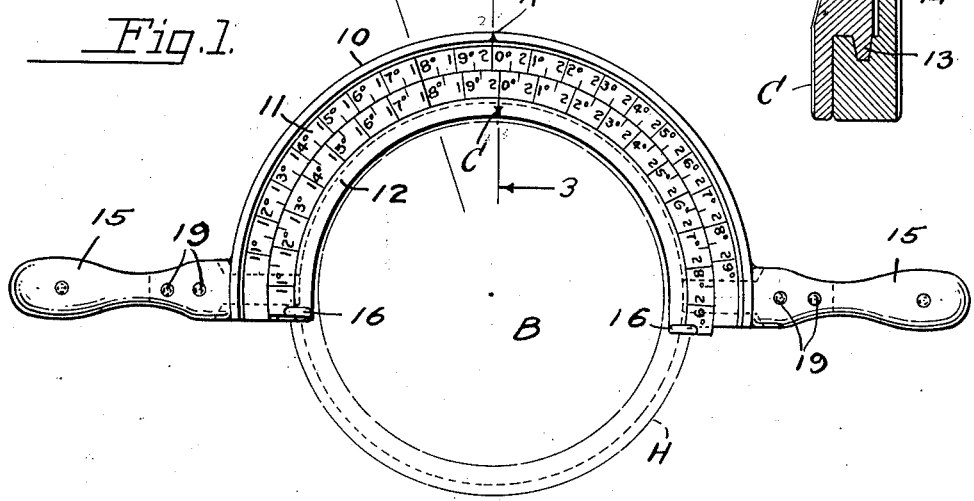
INVENTOR
JOHN B. KNEIP
By Robert A. Lavender
ATTORNEY Aug. 7, 1934.　　　　J. B. KNEIP　　　　1,968,837
PROPELLER BLADE PITCH GAUGE
Filed Feb. 29, 1932　　2 Sheets-Sheet 2
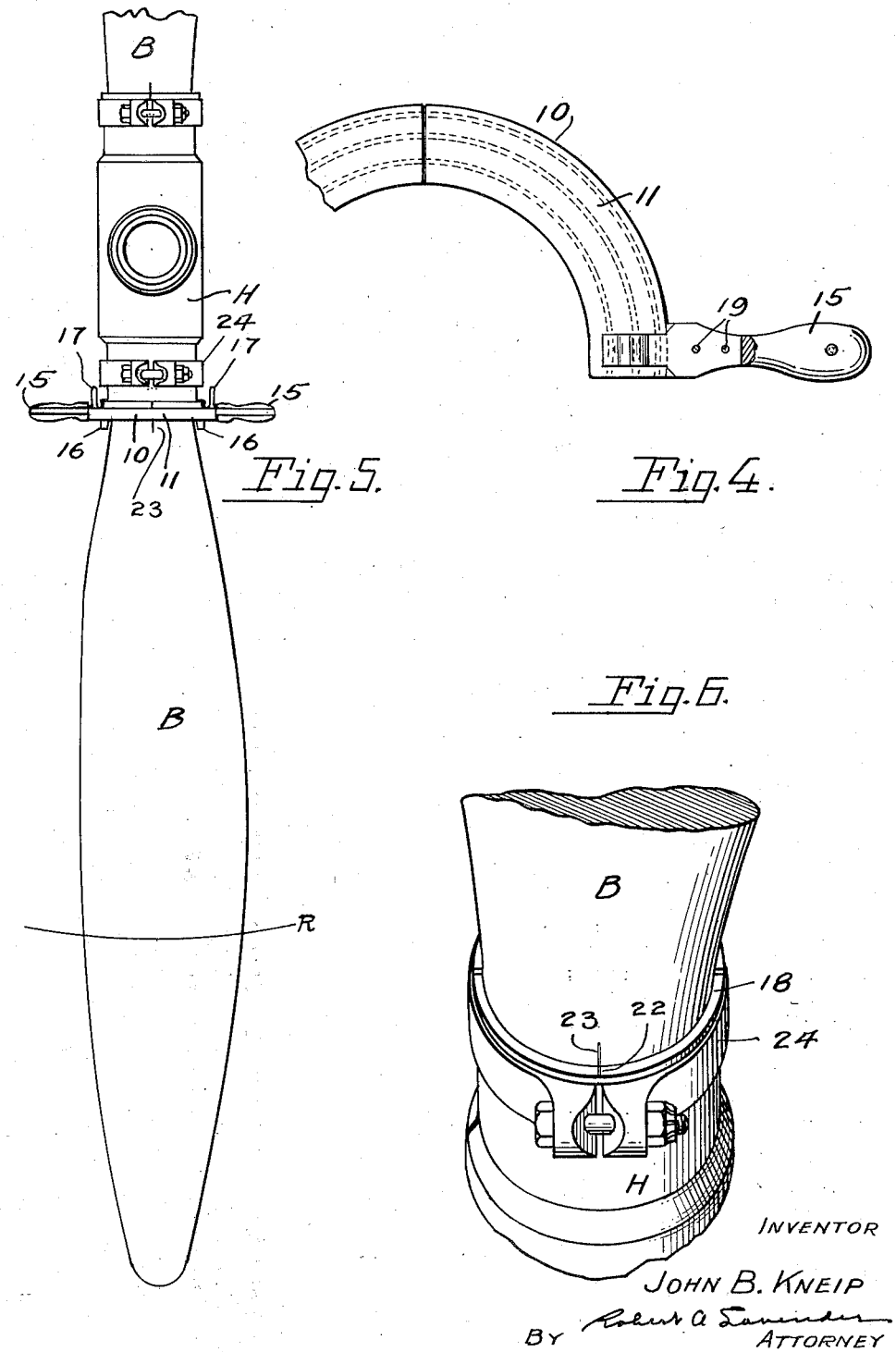

Patented Aug. 7, 1934

1,968,837

UNITED STATES PATENT OFFICE 1,968,837

PROPELLER BLADE PITCH GAUGE

John B. Kneip, United States Navy

Application February 29, 1932, Serial No. 595,818

6 Claims. (Cl. 33—180)

(Granted under the act of March 3, 1883, as amended April 30, 1928; 370 O. G. 757)

This invention relates to improvements in gauges for setting the pitch of propeller blades, and more particularly to the setting of the metal blades of aircraft propellers adjustably mounted in metal hubs.

An object of this invention is to provide an instrument for insuring quick and accurate setting of the angular pitch of propeller blades.

Another object of this invention is to provide a propeller blade pitch setting gauge capable of accurately determining the setting of the metal blades of aircraft propellers adjustably secured in metal hubs.

Another object of this invention is to provide a means for accurately and permanently determining the setting of the blades of metal aircraft propellers being adjustably secured in metal hub sockets, and to make possible the elimination of a multiplicity of graduation or degree marks on the blades or portions of the hub by confining the application of such identification score, bench marks or the like to a single bench mark to each blade and a corresponding mark on each hub socket. This improvement over the present practice will tend to reduce the hazards and dangers attended thereto resulting from fatigue, failures known to have resulted from bench marks, score marks or etched identification marks being placed upon metal aircraft propeller blades.

A further object of my invention is to provide an instrument for accurately setting and marking the pitch of the blades of aircraft propellers while in the shop, and thus eliminate the necessity of having to carry added weight and test equipment to the field.

With the above and other objects in view, this invention consists in the construction, combination and arrangement of parts as will be described more fully hereinafter.

Reference is to be had to the accompanying drawings forming a part of the specification, in which like reference characters indicate corresponding parts throughout the several views, and in which:

Fig. 1 is a plan view of my improved propeller pitch setting gauge;

Fig. 2 is a side view of the same, showing its application in an inverted position to a propeller;

Fig. 3 is an enlarged section on line 3—3 of Fig. 1;

Fig. 4 is a fragmentary bottom plan view showing a score line used in the aligning instrument;

Fig. 5 is a view of a propeller in position for setting, and showing the location of my gauge applied thereto.

Fig. 6 is a fragmentary perspective of a portion of a propeller hub and blade, showing the location of the bench marks in alignment.

Referring more particularly to the drawings, 10 indicates my improved gauge with an outer semi-circular member 11 and an inner member 12. The inner member 12 is constructed so as to be free to rotate in the outer member 11, and these members are fitted together as shown in Fig. 3 so that the tongues 13 formed on the member 12 will travel in an arcuate matched groove 14 in the member 11.

Adjustment of the gauge is accomplished by handle grips 15 secured to the outer member 11, and by lugs 16 located on the inner member 12.

Spring metal fingers 17 are mounted on the outer member 11 and form guides and insure a tight fit of the gauge about portions of the propeller hub H as at 18, as shown more clearly in Fig. 2. The spring fingers 17 are secured preferably at the handle grips 15 by means of rivets 19 or the like. In order to assure a greater range of flexibility, the spring fingers 17 are provided with loops 20. This flexibility of the springs will also allow the gauge to be used on propellers of slightly varying sizes. The spring fingers 17 terminate at their ends with the part 21, which engages the portion of the hub H as previously stated, and is especially useful in holding the gauge in position when inverted, as shown in Figs. 2 and 6, which position will be described later.

The setting of the blade is accomplished by turning the propeller blade to a vertical position with the tip of the blade pointing to the ground, and while in this position in which the propeller is assumed to be mounted upon an engine or test jig, the clamp collars 24 or other securing means provided on the propeller hub are opened or removed to permit the weight of the blade B to cause it to take a seat in its respective socket. In this manner there is eliminated any outward radial slack between the hub and blade adjustment after the clamp collar 24 has been finally tightened.

When making a setting of a propeller blade with my improved propeller setting gauge, I propose to line up the degree marks selected for the setting as indicated on members 11 and 12 as 22 and 23 respectively, to the graduation corresponding to the pitch setting desired, as for example, 18 degrees.

When a propeller blade setting is desired for a right-hand blade, I line up the degree marks of the gauge members to the designated graduation corresponding to the pitch desired, for example, 18 degrees; place the gauge with the side bearing the graduations face down; slide the gauge around the blade and hub, permitting the spring guide fingers 21 to engage the flange 18 of the hub H; line up the arrow A on outer member 11 with bench mark 22 on the hub and twist the blade around in a plane parallel to the ground until the mark 23 on the blade coincides with the arrow C on the inner member 12.

On one face of inner member 12 and covering approximately the entire arc of circumference of the inner member 12 are placed a series of radial equally spaced graduated marks, consisting of alternate long and short lines, the longer denoting degrees and the shorter half degrees. Similarly, on the face of outer member 11, which lies adjacent to the graduated face of inner member 12, are also placed a series of radial equally spaced graduated marks, consisting of alternate long and short lines, the longer denoting degrees and the shorter half degrees. The spaces between the graduations on the member 11 and the member 12 are such that the members form a vernier scale such that the readings of angular settings of the propeller blade may be observed to the tenth of one degree.

As most propeller pitch angles used in practice fall between 10 and 30 degrees, a range between 11 and 29 degrees has been selected for illustration and the long graduations on members 11 and 12 are numbered accordingly.

With this range of propeller pitch angles it is convenient to consider the actual distance between the longer lines on the outer member 11 to an actual angular measurement of nine degrees. With the actual angular distance between the longer lines on the outer members 11 equal to nine degrees, it is necessary to make the actual angular distance between the longer lines on inner member 12 greater by one degree or equal to ten degrees. It is essential that the actual angular distance between the longer lines on inner member 12 be greater by one degree than the actual angular distance between longer lines on outer member 11. In addition, on the same face of outer member 11 which carries the graduated pitch angular markings is placed for convenience coincident with the graduations of "20" degrees an arrow mark A. Similarly, on the graduated face of inner member 12 is likewise placed an arrow C coincident with the graduation of "20" degrees. These arrow marks, A and C, are to be used in connection with bench marks 22 and 23 which are placed on propeller blades and propeller hub sockets in order to obtain the proper positioning and to secure the correct pitch angle settings with my gauge.

For the purpose of illustrating the operation of setting my gauge to any desired pitch angular setting, I show it positioned for setting a propeller blade at an angle of 18 degrees (see Fig. 1).

In setting the blades of an aircraft propeller, it is customary to measure the pitch angle at a distance of 42" from the center of the hub, or at approximately ⅔ of the distance from the center line of the propeller shaft to the tips as at R by the use of protractor or triangular measurements.

In using my gauge for setting pitch angles on adjustable blade propellers, it is necessary to establish bench marks on the propeller blade and the propeller hub. Accordingly, a bench mark is stamped radially on the front of the propeller hub at any convenient point such as at 22 (see Fig. 6), and, adjacent and coincident thereto in a true fore and aft plane to the propeller shaft is stamped a similar bench mark on the propeller blade B at 23 with the blade having previously been set accurately at an angle of 20 degrees. It will thus be very evident and can be easily seen that with arrow A on outer member 11 coinciding with arrow C on inner member 12, and bench mark 22 on the propeller hub coinciding with bench mark 23 on the propeller blade, if the gauge be placed around the propeller blade so that A is in turn coinciding with 22 and C with 23, the propeller blade will then be set at an angle of 20 degrees. It is essential that the outer member 11 and the inner member 12 respectively have the arrow marks A and C placed on the same angular reading as that to which the propeller blade is set when the bench mark 23 is stamped on the propeller blade B adjacent and coincident to bench mark 22 on the propeller hub.

When setting a left-hand propeller blade, the graduations would be reversed or else would be read as for instance, 29 degrees setting would represent 11 degrees; 28 degrees setting would equal 12 degrees; 27 degrees would be equal to 13 degrees, and so on.

It will be understood that the above description and accompanying drawings comprehend only the general and preferred embodiment of my invention, and that various changes in construction, proportion and arrangement of parts may be within the scope of the appended claims without sacrificing any of the advantages of my invention.

The invention described herein may be manufactured and used by or for the Government of the United States of America for governmental purposes without the payment of any royalties thereon.

What I claim is:

1. In a device for determining the angular setting of propeller blades having bench marks thereon for indicating zero angle of the blade relative to like bench marks upon the hub, in combination, a semi-circular plate having graduations thereon adapted to sliding engagement about the circumference of a hub in juxtaposition to a blade, a second plate slidable about said first plate and having graduations for registration with the graduations on said first plate for determining a setting of the blade, and an indicator marking on said first plate for registration with the bench mark on the propeller blade.

2. In a propeller blade pitch setting gauge, an arcuate base plate adapted to encircle a portion of a propeller blade assembled in a propeller hub socket, clamping attachments on said base plate for holding the base plate in position on the hub, graduations on said base plate denoting angular readings, a score line on said base plate indicating a registration position relative to a bench mark on the propeller hub socket, a second arcuate member having sliding engagement with said base plate, graduations on a face of said second member for registration with the graduations on said base plate, and a score line on said second member for alignment in conjunction with a similar mark on the hub end of the propeller blade.

3. In a propeller blade pitch setting gauge for determining the angular setting of adjustable propeller blades in their hub sockets, in combination, a semi-circular outer member having graduations denoting angular readings, a score line on said outer member for registration with a zero angle indicating bench mark placed on the hub socket, an arcuate member slidably engaged with said outer member, graduations on said arcuate member for registration with the graduations on said outer member, a score line on said arcuate member for alignment with a bench mark placed on the base of the blade, means for slidably holding said outer member in position upon the hub socket, means carried by said outer member for rotating same, and means for moving said arcuate member around on said outer member.

4. In a propeller blade pitch setting gauge, in combination, an arcuate base plate having means adapted to be slidably attached about the base of the blade at the entrance to its respective hub socket, a second arcuate plate slidably attached to said base plate, graduations on said base plate and said second arcuate plate for determining the degrees of setting of the blade, a score mark on said base plate for indicating alignment adjustments relative to a bench mark carried by the propeller hub socket, and a score mark on said second plate for indicating alignment adjustments relative to a corresponding bench mark carried by the propeller blade.

5. In a device for determining the angular setting of propeller blades having bench marks thereon for indicating zero angle of the blades relative to like bench marks upon the propeller hub, in combination, a removable gauge comprising a semi-circular outer member adapted to be slidably located about the circumference of the root of a propeller blade in juxtaposition to the hub, and a semi-circular inner member slidably engaged with the outer member of said gauge, means for manually moving said gauge with respect to its position about the propeller blade and hub, means for manually moving said inner member relative to said outer member, vernier graduations on said gauge for reading the blade angle of setting, and indicator marks on said gauge for determining the setting of the blade relative to the zero markings of the propeller blade and hub.

6. In a device for determining the angular setting of propeller blades having bench marks thereon for indicating zero angle of the blades relative to like bench marks upon the propeller hub, in combination, a removable gauge comprising a semi-circular outer member adapted to engage the circumference of a propeller blade in juxtaposition to the propeller hub, means upon said outer member for engagement upon the hub, a semi-circular inner member slidably mounted with respect to the outer member of said removable gauge, vernier graduations on the outer member and the inner member of said gauge for determining the degree of setting of the blade, and index marks on the outer member and the inner member of said gauge for registration with the bench mark on the propeller blade and its hub.

JOHN B. KNEIP.